MAGNETIC CORES FOR GATES, BUFFERS AND FUNCTION TABLES

Filed Aug. 15, 1955 5 Sheets-Sheet 1

INVENTORS
THEODORE H. BONN
JOSEPH D. LAWRENCE, JR.
BY
Charles E. English
AGENT

INVENTORS
THEODORE H. BONN
JOSEPH D. LAWRENCE, JR.
BY Charles C. Englid
AGENT

INVENTORS
THEODORE H. BONN
BY JOSEPH D. LAWRENCE, JR
Charles C. English
AGENT

INVENTORS
THEODORE H. BONN
JOSEPH D. LAWRENCE, JR.
BY Charles C. English
AGENT

INVENTORS
THEODORE H. BONN
JOSEPH D. LAWRENCE, JR.
BY Charles C. English
AGENT

United States Patent Office 2,979,698

Patented Apr. 11, 1961

2,979,698

MAGNETIC CORES FOR GATES, BUFFERS AND FUNCTION TABLES

Theodore H. Bonn and Joseph D. Lawrence, Jr., Philadelphia, Pa., assignors to Sperry Rand Corporation, New York, N.Y., a corporation of Delaware Filed Aug. 15, 1955, Ser. No. 528,419

31 Claims. (Cl. 340—174)

The present invention relates to control circuits capable of operation, for instance, as gates, buffers and function tables, and more particularly relates to such control circuits utilizing cores of magnetic material in performing desired operations.

Control circuits have, in the past, often taken the form of vacuum tube circuitry, and while such circuitry is ordinarily acceptable, it has several disadvantages in that the resultant circuit is relatively large in size thereby making disposition of components within an over-all installation difficult; and further, due to the possible electrical failure which is relatively common in vacuum tubes, the said known circuits utilizing such vacuum tubes have been subject to erroneous operation and operational shut-downs thereby raising serious questions of maintenance and the cost attendant thereto.

In an attempt to obviate these difficulties, other forms of circuit components have been employed, and one such other form has comprised cores of magnetic material. In pulse type systems employing such cores of magnetic material, the operation of a given device has been dependent upon the hysteretic character of the core, and has been further dependent upon the provision of control pulses capable of preconditioning a core or cores utilized, prior to the application of a driving pulse. Thus, in these known types of magnetic circuits, especially of the pulse type, the practice in the past has been to apply a control pulse to the core, thereby to cause the core to move to a desired operating point and thereafter to apply a driving pulse to the said core whereby an output characteristic of the preconditioning is obtained. Such devices, when employed in pulse type systems, accordingly have the disadvantage that delay occurs between input and output.

In accordance with one embodiment of the present invention, this further disadvantage of known magnetic circuits may be obviated, and the said embodiment operates to permit control and driving pulses to be applied simultaneously to the core, thereby increasing the possible speed of operation of magnetic devices. In keeping with this operation, gates, buffers and function tables for instance, may be built from magnetic cores by placing input and output windings, for instance, on such cores and by so arranging these windings that the ampere turns of an output winding are restricted by the core from exceeding the ampere turns of input windings. When such structure is provided, control pulses may be applied to the input winding or windings, thereby to selectively nullify the magnetizing force effected by current flow through the output winding whereby the magnetic structure is caused to operate in a desired manner.

It is accordingly an object of the present invention to provide improved magnetic control circuits.

A further object of the present invention resides in the provision of magnetic circuits which may be employed as gates, as buffers, and/or as function tables.

Another object of the present invention resides in the provision of magnetic devices having better operating characteristics than those known heretofore.

A still further object of the present invention resides in the provision of control circuits in the nature of gates, buffers, and/or function tables which are more reliable in operation and less expensive to construct and maintain than circuits known heretofore.

Another object of the present invention resides in the provision of control circuits which may be made in relatively small sizes.

Still another object of the present invention resides in the provision of control circuits capable of more rapid operation than has been the case heretofore.

The foregoing objects and advantages of the present invention may be effected by providing control circuits in the nature of gates, buffers and/or function tables which employ one or more cores of magnetic material, each of which cores has at least one output winding and at least one input winding thereon. In accordance with one embodiment of the present invention, the said core of magnetic material may assume any hysteretic character provided the said material has a permeability considerably greater than air, a requirement which is met by practically all magnetic materials in general use. Such a core of magnetic material may have an output winding thereon coupled at one of its ends to a source of energization such as a pulse source, and coupled at the other of its ends to a load; and the said core may further carry an input winding thereon selectively coupled to a source of control pulses which may comprise the energization source mentioned previously.

This first embodiment of the present invention is characterized in its operation by the fact that the core of magnetic material normally operates in an unsaturated region of its hysteresis loop. It will be appreciated that for such operation current passing from the energization source through an output winding toward the load will effect a relatively large flux change through the said output winding whereby the output winding presents a relatively high impedance and little if any current actually passes through the load. For a desired output to the load, however, a further current may be passed through the input winding concurrently with passage of current from the energization source through the output winding toward the load, and this further current in the input winding produces a magnetomotive force of opposite polarity and nearly equal magnitude to that produced in the output winding whereby the net magnetomotive force experienced by the core is nearly zero, the flux change is relatively small, and the said output winding thereby presents a relatively low impedance, permitting the passage of appreciable current to the load.

In accordance with a further embodiment of the present invention, the core of magnetic material may be caused to operate in both its unsaturated and saturated regions, and the said core may comprise, for instance, a material exhibiting a substantially rectangular hysteresis loop. The core of this further embodiment may once more carry an input winding and an output winding thereon, whereby current flow from a energization source through the output winding toward a load coupled to the said output winding tends to drive the core from a saturated region into an unsaturated region of its hysteresis loop whereby the ouput winding again tends to exhibit a relatively high impedance. The application of current to the said input winding in this further embodiment of the present invention once more nullifies the magnetizing force of current flow through the output winding whereby the core is caused to remain in its saturated region, or in the alternative, is driven deeper into saturation, whereby the flux change through the output winding is relatively low when an output is desired; and the said output winding presents a relatively low impedance.

In each of the foregoing embodiments of the present invention, control inputs and driving inputs are applied to the said core simultaneously, and the function of the control input is to selectively nullify magnetization forces impressed upon the core which would tend to cause an output winding to exhibit a relatively high impedance.

The foregoing objects, advantages, construction and operation of the present invention will become more readily apparent from the following description and accompanying drawings, in which.

Figure 1:
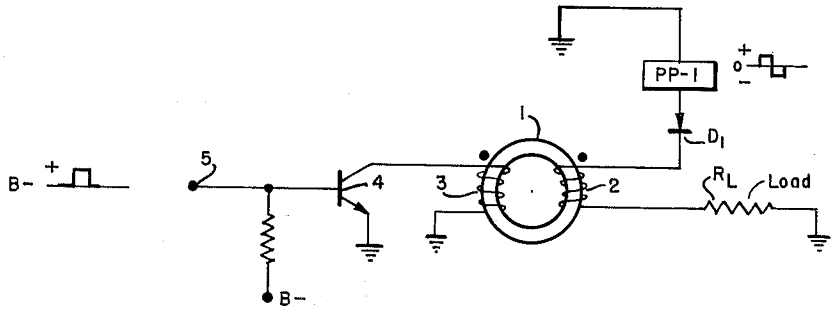
Figure 1 is a schematic diagram of a magnetic control circuit constructed in accordance with a first embodiment of the present invention.

Referring now to Figure 1, it will be seen that, in accordance with the present invention, a control circuit may comprise a core 1 having an output winding 2 and an input winding 3 thereon. The output winding 2 may be coupled at one of its ends via a rectifier D1 to a source of driving pulses PP–1 which are alternately positive and negative-going from a base level of zero, as shown by the waveform adjacent the said source PP–1. The other end of the said output winding 2 may be coupled via a load $R_L$, to ground. The input winding 3 may be grounded at one of its ends and may be coupled at the other of its ends to a current switch which, in the embodiment of Figure 1, is illustrated as a transistor 4 and the base of the said transistor 4 may in turn be coupled to an input terminal 5.

In operation, and assuming that no control input is applied to the terminal 5, it will be seen that when the power pulse source PP–1 produces a positive-going output pulse, current tends to flow via rectifier D1 and output winding 2 to the load $R_L$. If we should further assume that the core 1 normally operates in its unsaturated region between points A and B (see Figure 2), and that the said core is not permitted to reside in a region of saturation, the aforesaid current flow via output winding 2 toward load $R_L$ effects a relatively large flux change in the core 1 whereby winding 2 presents a relatively high impedance and very little current actually flows through load $R_L$. If a positive-going input pulse should be applied to terminal 5 in coincidence with the application of a positive-going power pulse from the source PP–1, however, the transistor 4 will be rendered conductive whereby current flows through input winding 3 producing an auxiliary magnetomotive force on the core 1, and this auxiliary magnetomotive force in turn nullifies the magnetizing effect of current flow through output winding 2 from the source PP–1 whereby the resultant flux change in core 1, upon application of an input pulse to terminal 5, is substantially zero. The output winding 2 thereby presents a relatively low impedance and appreciable current may flow from the source PP–1 to the load $R_L$. It will be appreciated that by this operation, current may be caused to flow selectively to the load $R_L$ during one or more of the regularly occurring power pulses produced by source PP–1, under the control of input pulses applied to winding 3 substantially simultaneous with one or more of the said driving pulses from source PP–1.

It will further be appreciated that, in the embodiment of Figure 1, the unsaturated core 1 will not pass current through its input coil 3 unless a current is also present in output coil 2. Thus, an input voltage applied to terminal 5 will permit current to flow in input coil 3, the driving force for such current being coupled into coil 3 from coil 2 when current flows in coil 2. To avoid presenting the input signal applied to terminal 5 with the possibility of either of two impedance states which would depend on the presence or absence of current in coil 2, the transistor 4 is inserted between input terminal 5 and input coil 3, and this transistor has the additional advantage of giving the system gain.

It is evident from the above analysis that core 1 and its associated coils acts as a transformer coupling impedance from the circuit associated with coil 3 into the circuit associated with coil 2. Thus, when transistor 4 presents a high impedance between collector and emitter, due to the absence of an input signal at terminal 5, this high impedance is coupled into the circuit associated with coil 2. This high impedance essentially blocks the flow of current from PP–1 to load $R_L$. When transistor 4 presents a low impedance between collector and emitter, due to the presence of a positive input signal at terminal 5, this low impedance is coupled by core 1 into the output circuit. This low impedance permits the flow of current from PP–1 to $R_L$.

The circuit shown in Figure 1 may be expanded and may be combined with similar circuits to permit the functions of gating and buffing to be accomplished. Thus, referring to Figure 3, it will be seen that, in accordance with a modification of the embodiment of Figure 1, a magnetic control circuit may comprise a core 10 having a plurality of of input windings 11, 12 and 13 and a plurality of output windings 14 and 15 thereon. A further core 23 having input windings 19 and 20 and output windings 21 and 22 may also be employed; and output windings on each of the said cores may be coupled to one another intermediate a source of energization pulses and a load to provide gating.

Figures 2, 3:
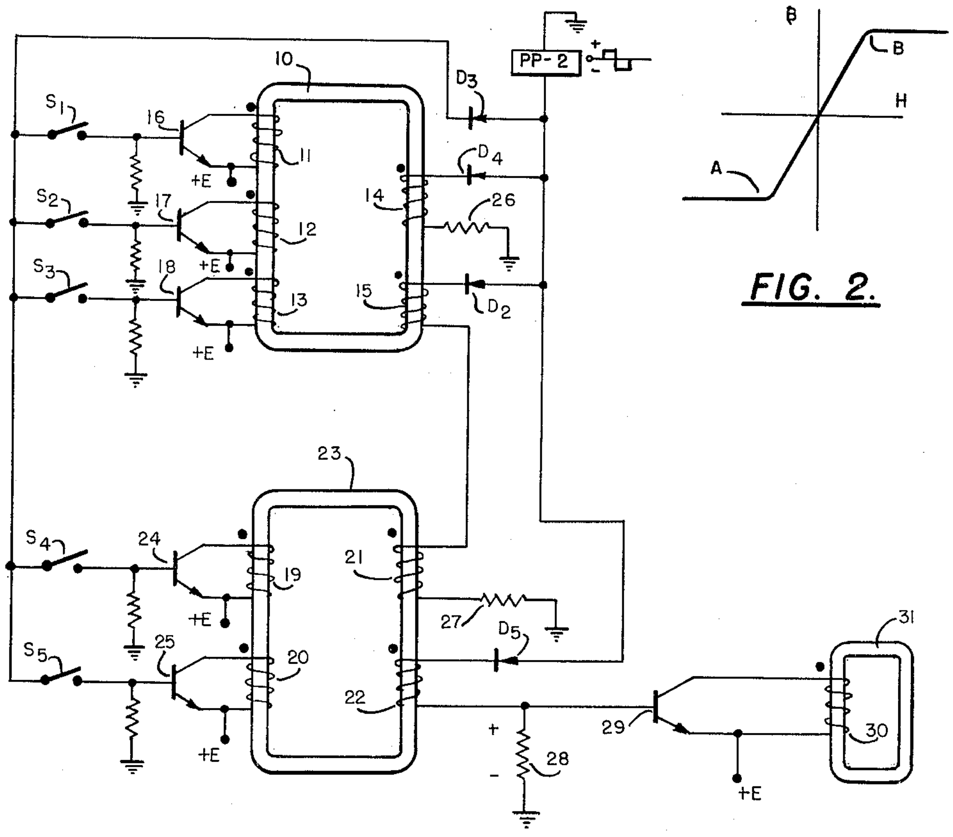
Figure 2 is a magnetic characteristic depicting the operation of the core utilized in the embodiment of Figure 1.
Figure 3 is a schematic diagram of a magnetic control circuit capable of performing the functions of gating and buffing and constructed in accordance with the embodiment of Figure 1.

Thus, considering the circuit of Figure 3 in greater detail, it will be seen that a source of energization pulses PP–2, again exhibiting regularly occurring positive and negative-going output pulses, may be coupled at one of its ends via a rectifier D2 to an output winding 15 carried by core 10, and the other end of the said winding 15 may be coupled to output winding 21 carried by core 23. The other end of output winding 21 may in turn be coupled via a load 27 to ground. No current will pass from the source PP–2 to the load 27 unless each of output windings 15 and 21 is in a low impedance state, whereby control inputs must be applied to each of cores 10 and 23 to permit the passage of such current to load 27. Windings 15 and 21 and their associated cores 10 and 23 comprise a gate. Input controlling signals may be applied to any one of input windings 11, 12 or 13 on core 10, and to any one of input windings 19 and 20, for instance, on core 23; and the said windings 11 through 13 and windings 19 and 20, thus exemplify the provision of buffed inputs to the two cores 10 and 23 respectively. Current flow through these input windings 11 through 13 and 19, 20 may be selectively controlled by transistors 16, 17, 18, 24 and 25 coupled, as shown, via switches S1 through S5 inclusive, and via a further rectifier D3 to the said source of energization pulses PP–2. The output winding 14 on core 10 may also be coupled to the said source PP–2 via a rectifier D4, whereby the arrangement of rectifier D4, output winding 14 and load 26 is analogous to the circuit connection of winding 2 shown in Figure 1.

In operation, a positive-going output pulse from source PP–2 tends to drive current via rectifier D4, winding 14 and load 26 to ground, and also tends to drive current via rectifier D2, windings 15 and 21 in series, and load 27 to ground. In the absence of controlling inputs to either of cores 10 and 23, each of windings 14, 15 and 21 (as well as winding 22 to be discussed subsequently), present a relatively high impedance whereby no current will flow to loads 26, 27 (or 28). If switch S1 should be closed, however, a positive-going pulse will be coupled via rectifier D3 and switch S1 to the base of transistor 16 at the same time that the said positive-going pulse is coupled via rectifier D4 to output winding 14. Transistor 16 will, therefore, be rendered conductive and the current flow through input winding 11 will nullify the magnetizing force effected by current flow through output windings 14 and 15, whereby each of windings 14 and 15 will present a relatively low impedance to the said positive-going pulse from source PP–2. The closure of switch S1 thus permits appreciable current to flow through winding 14 to load 26. Inasmuch as winding 21 on core 23 is still at relatively high impedance, substantially no current will flow to load 27.

If, however, switches S1 and S4, for instance, should each be closed, the occurrence of a positive-going power pulse from source PP–2 will apply drive to each of the windings 14, 15, 21 and 22, and will further provide nullifying inputs to the windings 11 and 19 via transistors 16 and 24, whereby each of the output windings 14, 15, 21 and 22 will assume a relatively low impedance. A direct output will thus appear across loads 26 and 28, and a gated output will appear across load 27. It will be appreciated that the aforesaid nullifying magnetization may be effected by the closure of any one of switches S1 through S3, in the case of core 10; or by the closure of either of switches S4 or S5 in the case of core 23, thereby to provide the possibility of buffed inputs to the cores 10 and 23.

Output winding 22 carried by core 23 is analogous to output winding 14 on core 10, and the said output winding 22 may be coupled at one of its ends via a further rectifier D5 to the source PP–2, and may be coupled at the other of its ends to load 28. The closure of one of switches S4 or S5 provides nullifying magnetomotive force to the core 23 simultaneous with the occurrence of drive to winding 22, in the manner described previously, whereby appreciable current may flow through the said winding 22 and via load 28 to ground. This current flow through load 28 effects a potential across the said load 28, of the polarity shown, whereby load 28 may be coupled to a further transistor 29 for applying controlling input to a winding 30 carried on a still further core 31. The arrangement of winding 22, load 28, transistor 29, winding 30 and core 31 is thus illustrative of the manner in which the output of one core may be coupled, as a controlling input, to a subsequent core thereby to permit various logical circuits to be constructed.

Summarizing the operation of the circuit shown in Figure 3, it will be seen that once more a source of regularly occurring power pulses tends to drive current to one or more loads via output windings carried on one or more cores and this current flow impresses such magnetizing forces on the said cores that current flow to the loads is inhibited in the absence of a nullifying magnetization force applied to one or more input windings carried by the said cores.

Figure 4:
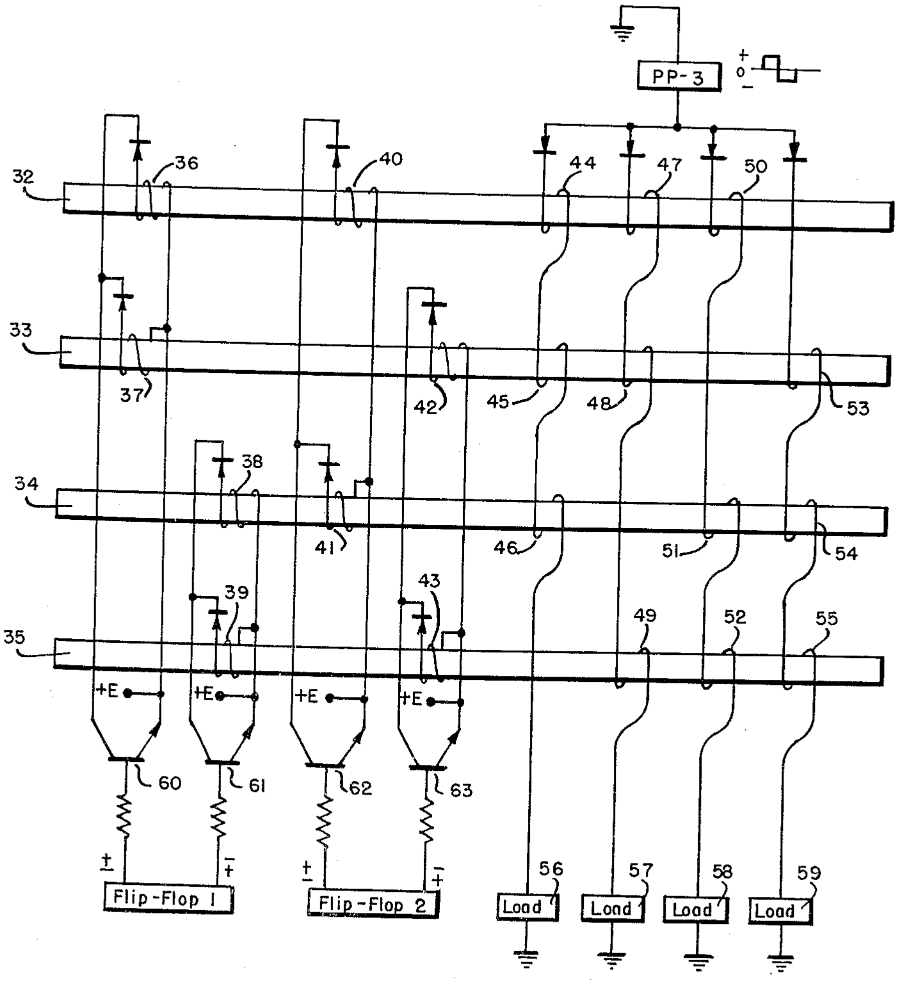
Figure 4 is a decoding function table constructed in accordance with the embodiment of Figure 1.

Using the principles disclosed above, both encoding and decoding function tables can be built, and Figure 4 illustrates a decoding function table constructed in accordance with one embodiment of the present invention. The said function table may comprise a plurality of cores 32, 33, 34 and 35; and the said cores may carry a plurality of input windings 36 through 43, arranged as shown, and a further plurality of output windings 44 through 55 inclusive. The said output windings are arranged into a plurality of series circuits comprising respectively windings 44 through 46, windings 47 through 49, windings 50 through 52 and windings 53 through 55, and each of the said series circuits is coupled at one of its ends to a pulse type energization source PP–3, and is coupled at the other of its ends to one of the loads 56 through 59 inclusive. Current through the several input windings 36 through 43 is controlled by transistors 60 through 63 which are in turn controlled by flip-flops FF–1 and FF–2. Each flip-flop has two transistors coupled to it; the first of which transistors will be in a conductive state and the second in a non-conductive state for one stable state of the flip-flop. For the second stable state of the flip-flop, the said first transistor will be non-conductive and the said second transistor will be conductive. For the function table of Figure 4 there are four unique input conditions and one load is uniquely energized for each input condition.

As before, the application of a positive-going power pulse from source PP–3 tends to drive current through each of the series circuits described previously toward each of the loads 56 through 59. As has been described in reference to windings 15 and 21 and load 27 in Figure 3, no current will pass to a given load unless each of the output windings in series therewith is caused to assume a low impedance and the said output windings will not assume such a low impedance unless a nullifying input is applied to its particular core.

Thus, in operation, if we should assume that flip-flops FF–1 and FF–2 produce outputs such that transistors 60 and 62 are rendered conductive during the application of a positive-going power pulse from source PP–3, nullifying current will pass through each of input windings 36, 37, 40 and 41 whereby each of cores 32, 33 and 34 will assume a low impedance to the said power pulse from source PP–3 while core 35 exhibits a high impedance to such a power pulse from source PP–3. Due to the arrangement of output windings 44 through 55 inclusive, current will flow from source PP–3, only to load 56, inasmuch as current flow is blocked to the remaining loads by high impedance windings 49, 52 and 55 carried by core 35. By the same token, if the flip-flops FF–1 and FF–2 should be so switched that transistors 61 and 62 are rendered conductive, each of cores 32, 34 and 35 will be switched to a low impedance and current will flow only to load 58. By analogy, it will be seen that for any given configuration of outputs from flip-flops FF–1 and FF–2, one and only one of the loads 56 through 59 will pass a current upon application of a driving pulse from source PP–3 whereby the device of Figure 4 acts as a decoding function table. It will be evident to those skilled in the art that function tables with more inputs and more outputs than are shown in Figure 4 can be built using principles described above and such function tables are intended to come within the scope of this invention.

Figure 5:
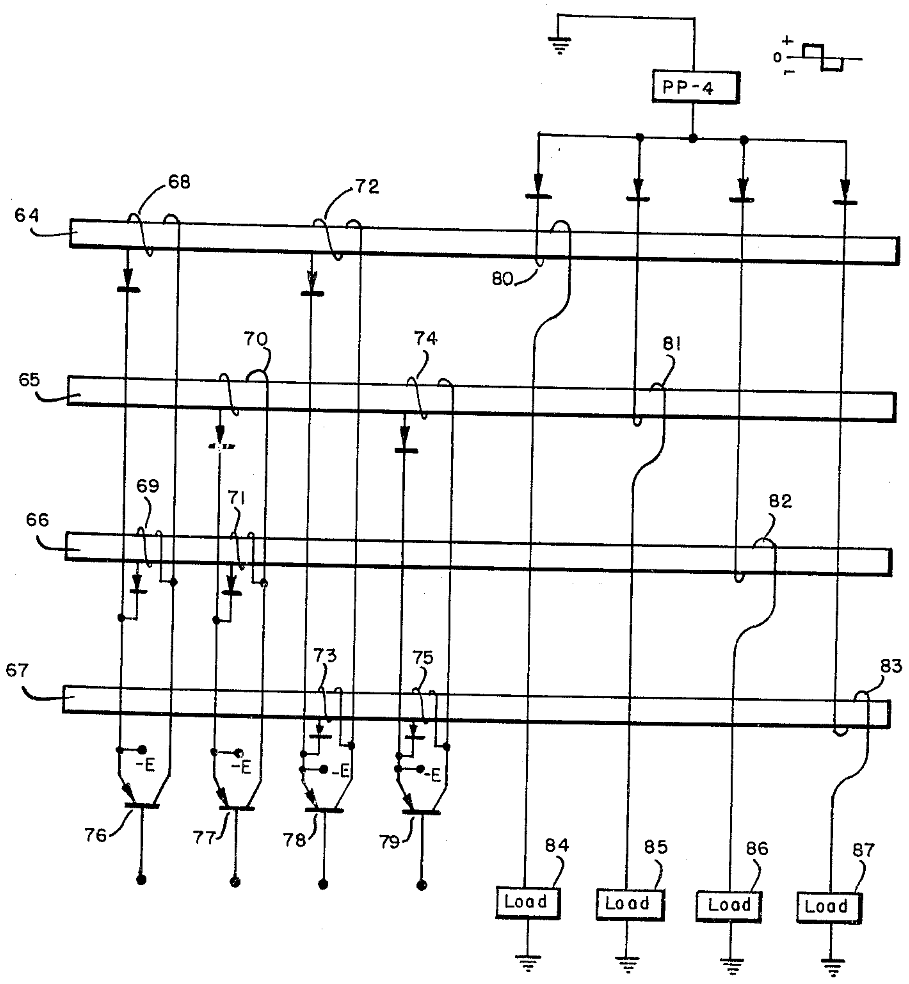
Figure 5 is an encoding function table constructed in accordance with the embodiment of Figure 1.

Figure 5 illustrates a modification of the device shown and described in reference to Figure 4 which is capable of acting as an encoding function table. This further embodiment of the present invention again employs a plurality of cores 64 through 67 inclusive, and the said cores are associated with a plurality of input windings 68 through 75 inclusive, the conductivity of which windings is selectively controlled by transistors 76 through 79, as shown. The said cores are further associated with a plurality of output windings 80 through 83, coupled, as shown, between an energization source PP–4 and loads 84 through 87 inclusive. The transistors 76 through 79 are so arranged that they are rendered conductive in response to a negative pulse applied to their bases rather than in response to the positive pulses previously described in reference to Figures 1 through 4, and a negative pulse applied to the base of any given transistor 76 through 79 will effect current flow through two of the loads 84 through 87.

Thus, if the base of transistor 76 should be switched negatively during the application of a positive-going power pulse from source PP–4, nullifying current will pass through input windings 68 and 69 thereby causing cores 64 and 66 to assume a low impedance, and drive from source PP–4 will therefore effect appreciable current flow through output windings 80 and 82 to loads 84 and 86 inclusive. The application of an input to transistor 77 similarly switches cores 65 and 66 to a low impedance state permitting current to flow via windings 81 and 82 to loads 85 and 86. An input to transistor 78 effects current flow to loads 84 and 87 while an input to transistor 79 effects current flow to loads 85 and 87, in the manner described. Encoding function tables with more inputs and more output than illustrated in Figure 5 can be built using the principles of this invention.

Each of the foregoing embodiments of the invention described in reference to Figures 1 through 5 has provided the desired control functions by operation of a magnetic core or cores in an unsaturated region only. By using both saturated and unsaturated regions of a core characteristic, however, gates, buffers, and/or function tables can be built which utilize fewer components than do the comparable systems described above.

Figure 6:
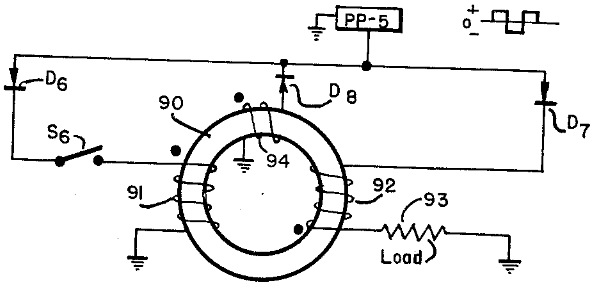
Figure 6 is a schematic diagram of a control circuit constructed in accordance with a further embodiment of the present invention.
Figures 7, 8:
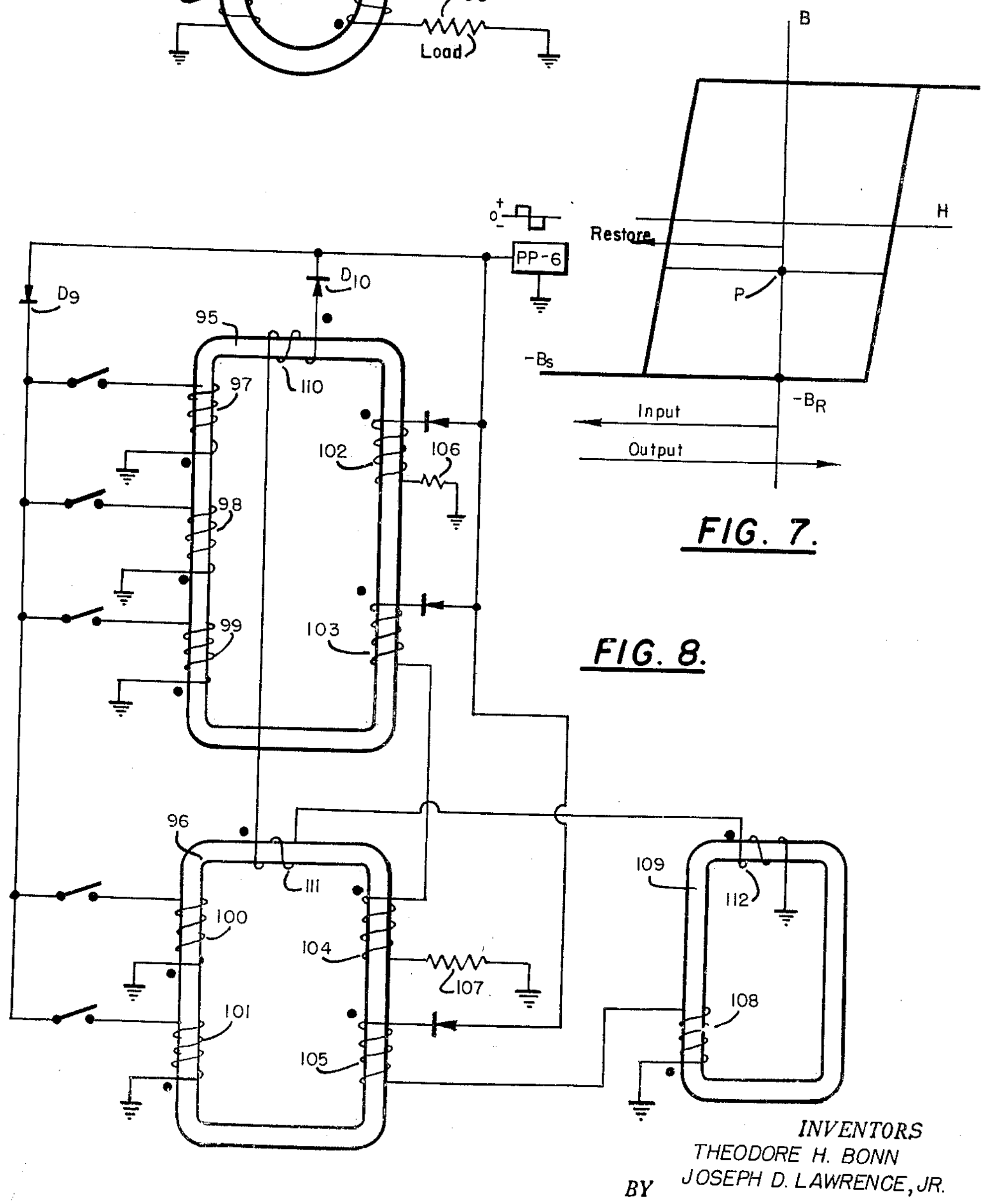
Figure 7 is an idealized hysteresis loop of a core material such as may be employed in the embodiment of Figure 6.
Figure 8 is a schematic diagram of a control circuit capable of performing the functions of gating and buffing and constructed in accordance with the embodiment of Figure 6.

Thus, referring to the schematic of Figure 6, and to the hysteresis characteristic shown in Figure 7, it will be seen that a core 90 may carry an input winding 91 and an output winding 92 thereon, in the manner already described. The said input winding 91 may be selectively coupled via a switch S6 and a rectifier D6 to a source of energization pulses PP–5, once more producing positive and negative-going regularly occurring pulses. The said source PP–5 may also be coupled via a rectifier D7 to one end of the output winding 92, and the other end of the said output winding may be coupled to a load 93.

In operation, and making reference to the characteristics shown in Figure 7, the core 90 may be caused to quiescently operate at a point $-B_R$. The application of a positive going power pulse from source PP–5 will thus effect current flow through the winding 92 and this current flow through the said winding 92 tends to drive the core 90 into an unsaturated region of its hysteresis loop whereby the said winding 92 exhibits a relatively high impedance in accordance with the previous discussion. If, however, the switch S6 should be closed prior to or simultaneous with application of a positive-going driving pulse from source PP–5, current flow will be effected in each of windings 91 and 92, whereby the resultant flux change in core 90 is substantially zero; or in the alternative, is such as to drive the said core from its minus remanenue operating point into its negative saturation region. In either case, the flux change through output winding 92, upon closure of switch S6, is relatively low, whereby output winding 92 presents a relatively low impedance and appreciable current may flow from source PP–5 via rectifier D7 and winding 92 to load 93.

It will be seen that, in accordance with this further embodiment of the present invention, if switch S6 should not be closed, upon application of a positive-going power pulse from source PP–5 the core 90 will be driven into an unsaturated region of its hysteresis loop, and upon removal of the said positive-going power pulse, the core will assume a magnetic condition represented by point P (see Figure 7). It is, therefore, necessary to restore the said core 90 to its minus remanence operating point ($-B_R$) prior to application of the next following positive-going power pulse, and this restoring function is effected by a reset winding 94 coupled via a further rectifier D8, poled as shown, to the said source PP–5. Due to the positive and negative-going output characteristic of source PP–5, it will be seen that positive-going pulses disconnect the rectifier D8 and connect rectifiers D6 and D7; while negative-going power pulses disconnect rectifiers D6 and D7 and connect rectifier D8. Thus, the negative-going power pulses from source PP–5 effect a restoring or reset current flow through reset winding 94 intermediate the application of positive-going power pulses, whereby the core 90 is returned to its minus remanence operating point subsequent to each positive-going power pulse. If switch S6 should have been closed during application of a positive-going power pulse whereby the core 90 remains in a saturated region thereby to produce an appreciable output, the next negative-going pulse from source PP–5 merely drives core 90 into negative saturation whereby the said core 90 returns to its minus remanence operating point preparatory to the next positive-going power pulse from source PP–5.

By utilizing both the unsaturated and saturated regions of the core hysteretic characteristic, the embodiment of Figure 6 need not employ the transistor elements utilized in the embodiments of Figures 1 through 5. On the other hand, the embodiment of Figure 6 does require the provision of reset means such as winding 94, and further requires a magnetic core material with a rather sharp change-over from low permeability (saturation) to high permeability. By comparison, therefore, the arrangements of Figures 1 and 6, while exhibiting somewhat analogous operation, each have distinct advantages, these advantages being characterized, for instance, by the less stringent magnetic core requirements of the embodiments of Figures 1 through 5 and by the lack of reset means, while the arrangement of Figure 6 is characterized by the lack of transistor switches.

The arrangement of Figure 6 may be employed in providing gates, buffers, and/or function tables, in a manner analogous to the circuits described in reference to Figures 3 through 5. Thus, referring to Figure 8, it will be seen that gating and buffing functions may be provided by a pair of magnetic cores 95 and 96; the said cores carrying respectively buffer input windings 97 through 99 and 100, 101 respectively; and also carrying output windings 102, 103, 104 and 105. A source of energization pulses PP–6 may be selectively coupled to one or more of the input windings 97 through 101, via a rectifier D9 and the several switches, arranged as shown. The said source of power pulses PP–6 may also be coupled via winding 102 to a load 106 and via windings 103 and 104, in series, to a further load 107, as described in reference to Figure 3. The load 106 provides a direct output in response to current flow through any of the input windings 97 through 99. Load 107 provides a gated output in response to the simultaneous application of inputs to one of windings 97 through 99, as well as to one of windings 100 or 101. The said source PP–6 may also be coupled to one end of winding 105, as shown, and the other end of the said winding 105 may be coupled to a further winding 108 carried on a still further core 109, thereby to illustrate the simplified connection obtainable in connecting the output of one circuit to the input of a further circuit, in accordance with this further embodiment of the present invention.

As has been described in reference to Figure 6, reset means must be applied in the gate-buffer of Figure 8, and these reset means take the form of windings 110, 111 and 112 coupled in series with one another and connected via a rectifier D10, poled as shown, to the said source PP–6. It should be noted, of course, that the ampere turns applied, for instance to the core 95, by current flow through any one of the coils 97 through 99, must be greater than, or equal to, the sum of ampere turns produced by all of the output coils carried by the said core 95, such as windings 102 and 103. This obtains inasmuch as one input coil must be capable of cancelling the magnetomotive force produced by all the output coils on the same core. A similar consideration applies, of course, to the winding configurations on cores 96 and 109, as well as to the winding arrangements already described in reference to Figures 3 through 5.

Figure 9:
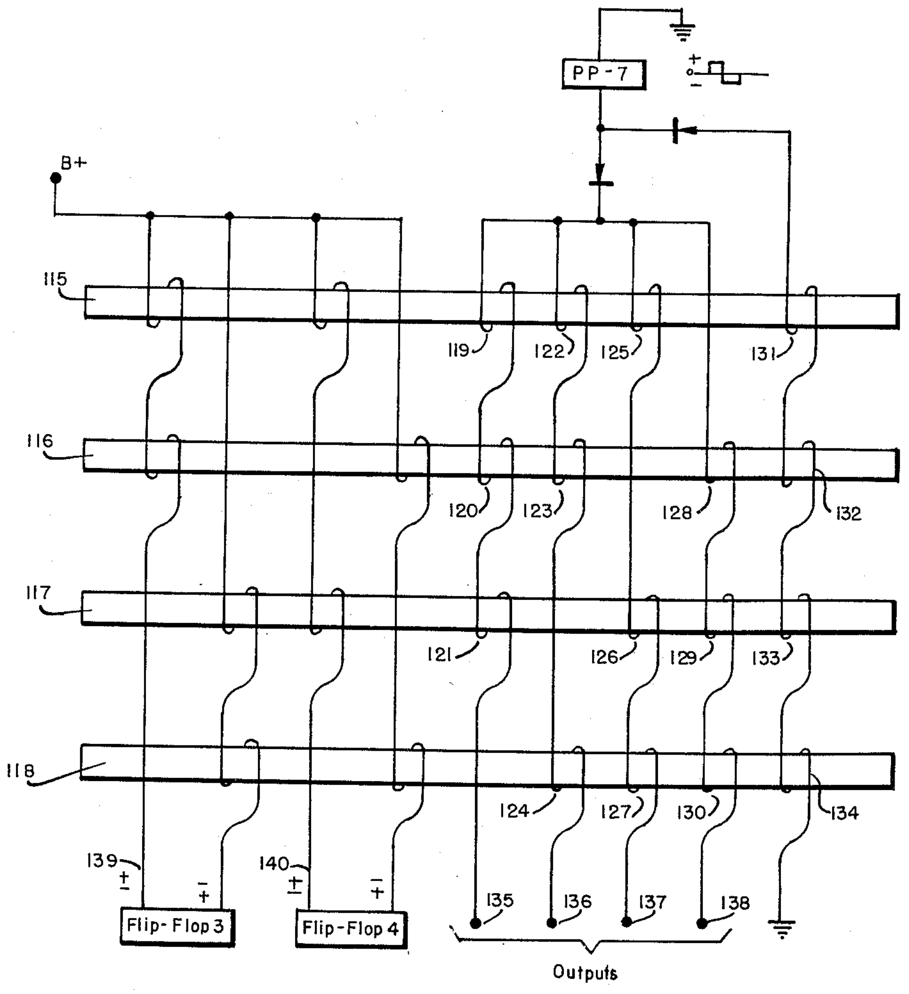
Figure 9 is a decoding function table constructed in accordance with the embodiment of Figure 6.

A function table performing the operation of the embodiment described in Figure 6 may also be provided, and one possible configuration for such a function table is shown in Figure 9. The particular arrangement again comprises a plurality of cores 115 through 118 inclusive, and the said cores cooperate with input windings under the control of flip-flops FF–3 and FF–4, as well as with output windings 119 through 130 inclusive, and reset windings 131 through 134 inclusive. Outputs may be taken at the terminals 135 through 138.

In operation, as before, current is selectively caused to pass through the several input windings under the control of flip-flops FF–3 and FF–4 during the application of positive-going power pulses from source PP–7, and reset current is thereafter caused to pass through windings 131 through 134 during the application of a negative-going pulse from the source PP–7. If we should assume, for instance, that the terminals 139 and 140 of flip-flops FF–3 and FF–4 are switched negatively, current will pass from the B+ source through input windings on each of cores 115, 116 and 117 whereby these cores 115 through 117 will assume a low impedance and an output may be obtained at output terminal 135. An analogous discussion applies to the other possible switch configurations of flip-flops FF–3 and FF–4, whereby for each such output configuration of these flip-flops, a unique output will be obtained at one of the output terminals 135 through 138.

While the arrangement of Figure 9 is meant to illustrate a decoding function table similar to that of Figure 4, it will be appreciated that an encoding function table analogous to Figure 5 may also be provided in accordance with this further embodiment of the present invention. Comparison of Figures 4 and 9 further illustrates the substantial saving in components obtainable by employing both the unsaturated and saturated regions of a hysteresis characteristic; and in particular, this saving of components is characterized by the elimination of the substantial number of diodes and transistors employed in the embodiment of Figure 4. As mentioned previously, of course, the saving in components is effected at the expense of the rather more stringent requirements of the core material, as well as by the provision of reset windings not required in the arrangement of Figure 4.

While preferred embodiments of the present invention have been described, it will be appreciated that many variations may be effected without departing from the principles of the present invention. The foregoing description is, therefore, meant to be illustrative only and is not limitative of our invention, and all such variations as are in accord with the principles discussed, are meant to fall within the scope of the appended claims.

Having thus described our invention, we claim:

1. In a control circuit, a core of magnetic material, first and second winding means on said core, a source of regularly occurring energization pulses coupled to one end of said first winding means, load means coupled to the other end of said first winding means, each of said regularly occurring energization pulses normally being of magnitude to substantially limit the operation of said core in response to said energization pulses alone to an unsaturated portion of its hysteresis loop whereby said first coil normally exhibits a relatively high impedance to each of said regularly occurring pulses and control means for selectively effecting a pulse of current flow through said second winding means substantially simultaneously with the occurrence of a selected one of said regularly occurring energization pulses from said source and of magnitude and direction to substantially nullify the magnetizing force of said first winding means in response to said energization pulses whereby said first winding means exhibits a relatively low impedance in response to occurrence of said simultaneous pulses thereby to effect a relatively large pulse of current flow from said source to said load via said first winding means.

2. The circuit of claim 1 wherein said control means comprises means selectively coupling pulses from said source to said second winding means in synchronism with the pulses coupled from said source to said first winding means.

3. The circuit of claim 1 wherein said control means includes switch means interposed between said source of energization pulses and said second winding means whereby pulses may be selectively and concurrently coupled to both said first and second winding means from said source of energization pulses.

4. The circuit of claim 1 wherein the ampere-turns of said second winding means is equal to or greater than the ampere-turns of said first winding means.

5. In a control circuit, a core of magnetic material having a coil thereon, a pulse source coupled to one end of said coil, load means coupled to the other end of said coil, a pulse of current flow from said pulse source through said coil toward said load being normally operative to impose a first pulse-type magnetization force on said core of magnitude substantially limiting the magnetization of said core to the unsaturated portion of its hysteresis loop thereby producing a relatively large flux change in said core whereby said core exhibits a relatively high impedance in said pulse of current flow, and control means selectively applying a second pulse-type magnetization force to said core at least equal in magnitude and opposite in polarity to said first magnetization force and in coincidence with a selected pulse from said source thereby to prevent the occurrence of said relatively large flux change in said core due to said current flow in said coil so that said coil exhibits a relatively low impedance to said pulse of current flow whereby appreciable current flows via said relatively low impedance coil to said load in response to said coincident first and second pulse-type magnetization forces.

6. The circuit of claim 5 wherein said control means comprises a further coil on said core, and switch means selectively operable to effect a pulse of control current flow in said further coil simultaneous with the occurrence of said selected pulse from said pulse source.

7. The circuit of claim 5 wherein said control means comprises a plurality of substantially independent control windings on said core, and means selectively effecting a pulse of control current flow through preselected ones of said control windings.

8. In a control circuit, a plurality of cores of magnetic material, an output winding on each of said cores, said output windings being coupled to one another in series, a source of regularly occurring energization pulses coupled to one end of said series connected output windings, a load coupled to the other end of said series connected output windings whereby pulses of current may flow from said pulse source toward said load through said output windings in series, each of said energization pulses being normally operative to effect an appreciable flux change in said cores whereby said output windings normally exhibit a relatively high impedance to said regularly occurring pulses, a control winding on each of said cores, and means for selectively effecting a pulse of current flow through preselected ones of said control windings in coincidence with a selected one of said pulses from said pulse source to prevent said appreciable flux change in selected ones of said cores thereby to cause selected ones of said output windings to exhibit a relatively low impedance to said selected pulse from said pulse source.

9. The circuit of claim 8 wherein the said means selectively effecting current flow through said control windings comprises a plurality of transistors coupled respectively to said plurality of control windings.

10. In a control circuit, a core of magnetic material, an output winding on said core, a pulse-type energization source coupled to one end of said winding, a load coupled to the other end of said winding whereby pulses of current flowing from said source to said load through said winding impress a magnetization force on said core of magnitude substantially limiting the operation of said core to an unsaturated portion of its hysteresis loop thereby to cause said winding to exhibit a relatively high impedance to said current flow, and control means coupled to said core and selectively operative simultaneously with occurrence of selected pulses from said energization source for nullifying the magnetization force effected by said selected pulses of current flow in said winding whereby said winding exhibits a relatively low impedance to said selected pulses of current flow.

11. The circuit of claim 10 wherein said control means comprises a control winding on said core, said energization source comprising means effecting regularly occurring energization pulses, said control means including means operative to pass pulses of control current through said control winding in coincidence with preselected ones of said energization pulses.

12. The circuit of claim 10 wherein said control means comprises a plurality of substantially independent control windings on said core, and means for selectively passing control current through preselected ones of said control windings.

13. A control circuit comprising a plurality of cores of magnetic material, each of said cores having a plurality of output windings thereon, means coupling selected ones of the said output windings to one another thereby to comprise a plurality of output circuits which include output windings of more than one of said cores, a pulse source coupled to one end of each of said output circuits, a plurality of loads coupled respectively to the other ends of said plurality of output circuits, and means applying auxiliary magnetomotive forces to selected ones of said plurality of cores in coincidence with preselected pulses of said pulse source thereby to selectively nullify the magnetomotive forces effected by current flow through selected ones of said output circuits.

14. The circuit of claim 13 wherein at least one of said loads comprises a control winding carried by a further core of magnetic material.

15. The circuit of claim 13 wherein at least one of said loads comprises a transistor, a further core of magnetic material, and a control winding on said further core, said transistor being interposed between the said other end of one of said output circuits and the said control winding on said further core.

16. The circuit of claim 13 wherein said control circuit comprises a decoding function table, each of said output circuits comprising output windings of less than all of said plurality of cores.

17. The circuit of claim 13 wherein said control circuit comprises a decoding function table, each of said output circuits comprising a plurality of series connected windings carried respectively by more than one but less than all of said cores, said means applying auxiliary magnetomotive forces to selected ones of said cores comprising a plurality of input windings carried by said cores respectively, and a further pulse source selectively coupled to selected ones of said input windings.

18. The circuit of claim 17 wherein selected ones of said plurality of input windings are coupled to one another thereby to define a plurality of input circuits each of which includes input windings carried by more than one of said cores.

19. The circuit of claim 18 wherein the selected ones of said input windings comprising each of said input circuits are connected in series with one another.

20. The circuit of claim 18 wherein the selected ones of said input windings comprising each of said input circuits are connected in parallel with one another.

21. A control circuit comprising a plurality of cores of magnetic material, each of said cores having input winding means and output winding means thereon, a pulse source coupled to one end of said output winding means and operative to produce a magnetomotive force of magnitude such that said cores are operated in the unsaturated portion of their hysteresis loop in response to current flow from said pulse source, a plurality of loads coupled respectively to the other ends of said output winding means, and means selectively effecting current flow through selected ones of said input winding means in coincidence with preselected pulses of said pulse source thereby to selectively nullify the magnetomotive forces effected by current flow from said pulse source through preselected ones of said output winding means to preselected ones of said loads.

22. A control circuit comprising a plurality of cores of magnetic material, a plurality of input windings linked to each of said cores, means coupling said input windings of selected ones of said cores in first preselected serial groups, a plurality of output windings linked to each of said cores, means coupling said output windings of selected ones of said cores in second preselected serial groups, a source of periodic pulses coupled to said output windings and tending to produce current flow through each of said second preselected serial groups during said pulses, a plurality of loads each coupled to receive current flow from one of said second preselected serial winding groups during said pulses, and means for selectively effecting current flow through selected ones of said first preselected serial winding groups in coincidence with said pulses of said source thereby to selectively nullify magnetomotive forces applied by current flow in said second preselected serial groups to those of said cores associated with said selected ones of said first preselected serial groups to reduce the effective impedance of those of said output windings associated with the cores of said selected ones of said first preselected serial groups thereby to produce a substantial current flow from said pulse source to a certain one of said loads.

23. In a control circuit, a core of magnetic material exhibiting a substantially rectangular hysteresis loop and having a coil thereon, a pulse source coupled to one end of said coil, load means coupled to the other end of said coil, a pulse of current flow from said pulse source through said coil toward said load being normally operative to impose a first pulse-type magnetization force on said core thereby producing a relatively large flux change in said core whereby said coil exhibits a relatively high impedance to said pulse of current flow, and control means selectively applying a second pulse-type magnetization force to said core coincident with said first pulse-type magnetization force and at least equal in magnitude and opposite in polarity to said first magnetization force thereby to prevent the occurrence of said relatively large flux change in said core due to said current flow in said coil so that said coil exhibits a relatively low impedance to said pulse of current flow whereby appreciable current flows via said relatively low impedance coil to said load in response to said coincidence first and second pulse-type magnetization forces.

24. In a control circuit a plurality of cores of magnetic material, each of said plurality of cores including an output winding, a pulse-type energization source, a plurality of loads, means connecting preselected ones of said output windings in series with one another between said energization source and said plurality of loads whereby pulses of current flowing from said source to said loads through said windings impress a magnetization force on each of said cores thereby to cause said output windings to exhibit a relatively high impedance to said current flow, and control means coupled to each of said plurality of cores for selectively nullifying the magnetization force effected by current flow through the output windings of said cores, whereby appreciable current flows from said energization source to a given one of said plurality of loads when each of the output windings in series with said load has the said magnetization force nullified on its corresponding core.

25. In a control circuit a core of magnetic material, normally operating in a saturated region of its hysteresis loop, an output winding on said core, a pulse-type energization source coupled to one end of said winding, a load coupled to the other end of said winding whereby pulses of current flowing from said source to said load through said winding impress a magnetization force on said core of magnitude and direction operative to drive said core into an unsaturated region of its hysteresis loop thereby to cause said winding to exhibit a relatively high impedance to said current flow and control means coupled to said core and selectively operative simultaneously with occurrence of selected pulses from said energization source, said control means comprising means imposing an auxiliary magnetization force on said core in opposition to said first mentioned magnetization force whereby said core is caused to selectively remain in its said saturated region during passage of current from said source to said load to cause said winding to exhibit a relatively low impedance to said selected pulses of current flow.

26. The circuit of claim 25 wherein said core comprises a magnetic material exhibiting a substantially rectangular hysteresis loop.

27. A control circuit comprising a plurality of cores of magnetic material, each of said cores having input winding means and output winding means thereon, selected ones of said input winding means being coupled to one another thereby to comprise a plurality of input circuits each of which includes input winding means on more than one but less than all of said cores, a pulse source coupled to one end of said output winding means, a plurality of loads coupled respectively to the other ends of said output winding means, and means selectively effecting current flow through selected ones of said input winding means in coincidence with preselected pulses of said pulse source thereby to selectively nullify the magnetomotive forces effected by current flow from said pulse source through preselected ones of said output winding means to preselected ones of said loads.

28. The control circuit of claim 27 wherein at least one of said cores includes a plurality of input windings coupled respectively into different ones of said input circuits.

29. The control circuit of claim 27 wherein each of said cores includes a plurality of output windings, selected ones of said output windings being coupled to one another thereby to comprise a plurality of output circuits interposed between said loads and said pulse source, each of said output circuits including output windings of more than one but less than all of said cores.

30. A control circuit comprising a plurality of cores of magnetic material, each of said cores having input winding means and output winding means, selected output windings of said output winding means being coupled to one another thereby to comprise a plurality of output circuits interposed between said loads and said pulse source, at least one of said output circuits including windings of more than one but less than all of said cores, a pulse source coupled to one end of said output winding means, a plurality of loads coupled respectively to the other ends of said output winding means, and means selectively effecting current flow through selected ones of said input winding means in coincidence with preselected pulses of said pulse source thereby to selectively nullify the magnetomotive forces effected by current flow from said pulse source through preselected ones of said output winding means to preselected ones of said loads.

31. The control circuit of claim 30 wherein at least one of said cores includes a plurality of output windings coupled respectively into different ones of said output circuits.

References Cited in the file of this patent

UNITED STATES PATENTS

| | | |
|---|---|---|
| 2,709,798 | Steagall | May 31, 1955 |
| 2,729,808 | Auerbach et al. | Jan. 3, 1956 |
| 2,733,860 | Rajchman | Feb. 7, 1956 |
| 2,734,182 | Rajchman | Feb. 7, 1956 |
| 2,734,183 | Rajchman | Feb. 7, 1956 |
| 2,763,851 | Haynes | Sept. 18, 1956 |
| 2,766,388 | Wulfing | Oct. 9, 1956 |
| 2,768,367 | Rajchman | Oct. 23, 1956 |
| 2,780,771 | Lee | Feb. 5, 1957 |
| 2,813,207 | Bonn | Nov. 12, 1957 |
| 2,827,573 | Eckert | Mar. 18, 1958 |
| 2,843,317 | Steagall | July 15, 1958 |
| 2,846,671 | Yetter | Aug. 5, 1958 |
| 2,854,586 | Eckert | Sept. 30, 1958 |

OTHER REFERENCES

"Magnistors—Amplifiers or Storage Elements," Electronic Design, April 1955, pp. 26 to 27.